UNITED STATES PATENT OFFICE.

HAROLD A. LEVEY, OF NEW ORLEANS, LOUISIANA.

PROCESS OF TREATING FATTY ACIDS AND GLYCERIDS THEREOF.

1,374,589.

Specification of Letters Patent. Patented Apr. 12, 1921.

No Drawing. Application filed September 19, 1916. Serial No. 121,016.

*To all whom it may concern:*

Be it known that I, HAROLD A. LEVEY, a citizen of the United States, residing at New Orleans, in the parish of Orleans and State of Louisiana, have invented a new and useful Improvement in Processes of Treating Fatty Acids and Glycerids Thereof, of which the following is a specification.

My invention relates to a certain new and useful process for the treatment of fatty acids and glycerids thereof, the invention being primarily directed to the dehydrogenation of such materials with a view to improving their drying properties.

More specifically the invention relates to the treatment of fatty acids and their glycerids of animal, vegetable or marine origin, with hydrogen, nitrogen, carbon-monoxid, carbon dioxid or other gases at pressures both above and below atmospheric, and in the presence of a catalytic material, such as metallic nickel, copper, cobalt, iron, platinum, palladium, their oxids and salts, either alone or carried by or deposited on such materials as thoria, alumina, infusorial earth, fullers' earth and the like bulky or voluminous inert bodies, and at temperatures above those at which hydrogenation would be affected under the same conditions, the temperature being of course below that at which decomposition of the oil takes place, the gas, catalyst and oil being kept continuously in a state of intimate mixture as by means of mechanical agitation.

In general, it may be stated that by the process thus briefly outlined, the oil will be dehydrogenated, as evidenced by an increased iodin number, and, furthermore, the dehydrogenation will have been effected in such a manner as to effect a noteworthy change in the drying properties of the oil, it being generally true that when the iodin number has been increased to about 150, the oil appears to possess drying properties comparable with raw linseed oil.

A further development of my invention relates to the production of an unsaturated drying product from an unsaturated non-drying product. Thus, if a non-drying, semi-drying, or drying oil of low saturation be hydrogenated according to the known processes, and at the end of such period of hydrogenation be subjected to my dehydrogenating process, the resultant product will be found to be markedly superior in drying properties as compared with the original product, although, in fact, it may be less unsaturated than the original product. This would appear to indicate that the hydrogen removed by the dehydrogenating process is not the same hydrogen, structurally speaking, which is added by a hydrogenation process.

The apparatus employed for carrying out my process and the technique or manipulative operation may be the same as that made use of in the art of hydrogenation.

In order that the invention may be more fully understood, I will give examples of various specific processes in accordance with the invention.

A standard grade of cotton-seed oil is placed in a converter of the usual type employed in hydrogenation and which has been previously charged with a catalyst, such as lump kieselguhr having deposited thereon hydrogen-reduced nickel. The converter being maintained at atmospheric pressure, a stream of hydrogen is passed through the mass of oil and catalyst, which is meanwhile kept thoroughly agitated, and the temperature of the converter is maintained at between 220° and 250° C., better results being secured at the higher temperature. Within 10 to 14 hours the iodin number of the oil will be found to have increased about 8 per cent. indicative of a proportionate increase in degree of unsaturation.

If nitrogen gas be substituted for hydrogen in conducting the above described process, other conditions being the same, the increase in the degree of unsaturation is found to be somewhat greater, ranging from 10 to 12 per cent.

Carbon-dioxid appears to be in all respects the equivalent of nitrogen in the process, producing in so far as has been ascertained the same quantitative result.

The best results which I have obtained have been secured by the use of carbon-monoxid, operating at a temperature of approximately 255° C. Conducting the operation as above described, except for the increased temperature and use of carbon-monoxid in place of the other gases named, I obtain an increase in unsaturation of approximately 20 per cent.

As an example of the second phase of my process, that is, the production of a drying oil by first hydrogenating and then dehydrogenating, the following illustration may be given: Perilla oil of an iodin number of 190 may be hydrogenated in the usual manner until the iodin number is reduced to approximately 90. By the above-described processes it may then be dehydrogenated up to an iodin number of 140, or thereabout, equivalent to an increase of unsaturation of approximately 55 per cent. The dehydrogenated oil will be found to be substantially superior in drying properties to both the original product (which, in fact, though more unsaturated has practically no drying properties), and the hydrogenated product (which is more saturated). It seems certain therefore that the process of dehydrogenation is not a mere reversal of the process of hydrogenation but that, in fact, the hydrogen atoms split off in the dehydrogenating process bear a relation to the molecular structure which is different from that of the atoms added by the hydrogenation process.

In general, it may be stated that the catalyzers useful for hydrogenation are also useful for dehydrogenation, although their relative values as catalyzers are not in every instance in the same order. For example, copper is relatively more active in dehydrogenation than in hydrogenation. Palladium and nickel appear to head the list in dehydrogenation as well as in hydrogenation however.

The temperatures effective for dehydrogenation appear to range upward to the point at which the oil breaks down, the rate of reaction increasing with the temperature. By the use of super-atmospheric pressures the decomposition temperature of the oil may be raised thus permitting the employment of higher reaction temperatures if desired.

The function of the gases employed in the process with the exception of carbon-monoxid seems to be primarily mechanical rather than chemical. In the case of carbon-monoxid, however, the action is both chemical and mechanical, the carbon-monoxid uniting with the hydrogen liberated in the process to form methane and water according to the following reaction:

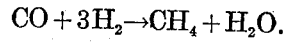
$$CO + 3H_2 \rightarrow CH_4 + H_2O.$$

Any tendency to form nickel carbonyl is arrested by the temperatures employed which are higher than the point at which nickel carbonyl breaks up. There is therefore no detrimental effect attributable to the carbon-monoxid, and the action of the latter in uniting with the hydrogen should in theory accelerate the reaction by prompt removal of this nascent hydrogen from the field of reaction. The process is in its nature an equilibrium process governed by the laws of mass action. This prompt removal of the hydrogen set free should effect a great increase in the speed of conversion. These conclusions are fully borne out by the practice of my process, it appearing that the carbon-monoxid produces a substantially greater degree of unsaturation in the same time.

By the use of my process in its first phase, non-drying and semi-drying oils, such as the various seed oils, animal oils, or fish oils, may be economically treated to produce products comparable as to their drying properties in moist air with raw linseed oil. By the second phase of my process the same results may be secured. The exact process to be employed on any particular raw material for obtaining a product of any desired standard of drying properties will be determined by the conditions met with. In general, raw materials of a moderate degree of saturation may be satisfactorily treated to produce a good quality of drying oil by the dehydrogenating step alone. Where more unsaturated raw materials are employed or where it is desired to produce a better or different grade of final product, the hydrogenating step followed by the dehydrogenating step will be employed.

While I have described in considerable detail some specific instances of the changes which may be effected by dehydrogenation, either alone or preceded by hydrogenation, with a particular view to improving the drying qualities of the material under treatment, it is to be understood that the foregoing examples are illustrative only and for the purpose of making clear the nature and some of the uses of the invention and the general principles underlying the same, and that I do not regard the invention as limited to the treatment of any specific material according to any of these specific methods outlined, nor to the object or purpose of improving or changing any specific property of the oil, such as the drying property mentioned, save in so far as such limitations are included within the terms of the following claims in which it is my intention to claim all novelty inherent in my invention as broadly as is permissible in view of the prior art.

What I claim as new and desire to secure by Letters Patent, is:—

1. The process of dehydrogenating fatty oils which consists in subjecting the oil to the action of gas in the presence of a catalytic material intimately mingled with the oil under treatment and at a temperature in excess of that at which hydrogenation is affected under the same conditions by passage of hydrogen.

2. The process of dehydrogenating fatty oils which consists in subjecting the oil in a liquid state to the action of gas in the presence of a finely-divided catalytic material, and continuously agitating the mixed oil and catalyst, the operation being conducted at a temperature in excess of that at which hydrogenation would take place under the same conditions by passage of hydrogen.

3. The process of dehydrogenating fatty oils which consists in subjecting the oil in a liquid state to the action of a finely-divided catalytic material, continuously agitating the mixed oil and catalyst, and continuously exposing fresh surfaces of the oil under treatment to a current of gas, the operation being conducted at a temperature in excess of that at which hydrogenation would take place under the same conditions by passage of hydrogen.

4. The process of dehydrogenating fatty oils which consists in subjecting the oil in a liquid state to the action of a finely-divided catalytic material, continuously agitating the mixed oil and catalyst, and continuously exposing fresh surfaces of the oil under treatment to a current of carbon-monoxid, the operation being conducted at a temperature in excess of that at which hydrogenation would take place under the same conditions by passage of hydrogen.

5. The process of dehydrogenating fatty oils which consists in subjecting the oil in a liquid state and while at a temperature substantially of 255° C. to the action of a finely-divided catalytic material, continuously agitating the mixed oil and catalyst, and continuously exposing fresh surfaces of the oil under treatment to a current of carbon-monoxid.

6. The process of treating fatty oils to change the characteristics thereof which consists in first hydrogenating and then dehydrogenating a liquid body of such oil.

7. A fatty oil the drying properties of which are similar to those of raw linseed oil and produced by dehydrogenating a fatty oil, the drying properties of which are not comparable with those of raw linseed oil.

HAROLD A. LEVEY.